(12) United States Patent
Zhengdi (10) Patent No.: US 6,956,888 B2
(45) Date of Patent: Oct. 18, 2005

(54) CHANNEL ESTIMATION IN A CELLULAR COMMUNICATION SYSTEM

(75) Inventor: Qin Zhengdi, Oulu (FI)

(73) Assignee: Nokia Corporation, Espoo (FI)

( * ) Notice: Subject to any disclaimer, the term of this patent is extended or adjusted under 35 U.S.C. 154(b) by 883 days.

(21) Appl. No.: 09/838,818

(22) Filed: Apr. 19, 2001

(65) Prior Publication Data

US 2003/0210667 A1 Nov. 13, 2003

Related U.S. Application Data

(63) Continuation of application No. PCT/EP98/06992, filed on Oct. 26, 1998.

(51) Int. Cl.[7] .................................................. H04B 1/69
(52) U.S. Cl. ....................................................... 375/130
(58) Field of Search ................................ 375/130, 140, 375/141, 142, 143, 144, 145, 146, 147, 148, 149, 150, 151, 152, 153; 370/249, 252, 320, 335, 342, 441

(56) References Cited

U.S. PATENT DOCUMENTS

| | | | |
|---|---|---|---|
| 5,719,899 A | * 2/1998 | Thielecke et al. | 375/144 |
| 5,732,114 A | 3/1998 | Thebault et al. | 375/368 |
| 6,097,711 A | * 8/2000 | Okawa et al. | 370/335 |
| 6,175,558 B1 | * 1/2001 | Miya | 370/335 |
| 6,275,525 B1 | * 8/2001 | Bahai et al. | 375/232 |
| 6,697,350 B2 | * 2/2004 | Lomp | 370/342 |

FOREIGN PATENT DOCUMENTS

| | | |
|---|---|---|
| EP | 0339349 | 11/1989 |
| WO | WO 96/24988 | 8/1996 |

OTHER PUBLICATIONS

Yukihiko Okumura, Koji Ohno and Fumiyuki Adachi; "Variable Rate Data Transmissions on Single Code–channel in DS–CDMA", The Institute of Electronics, Information and Communication Engineers, 1996, pp. 56–60.

Yow–Jong Liu, Mark Wallace and John W. Ketchum, "A Soft–Output Bidirectional Decision Feedback Equalization Technique for TDMA Cellular Radio", IEEE Journal on Selected Areas in Communications, vol. II, No. 7, Sep. 1993, pp. 1034–1045.

International Search Report for PCT/EP98/06992.

* cited by examiner

*Primary Examiner*—Chieh M. Fan
(74) *Attorney, Agent, or Firm*—Squire, Sanders & Dempsey LLP (57) ABSTRACT

A method of channel estimation in a cellular communication system is described. Symbols are transmitted between a mobile station and a base station. According to the described method, an incoming signal is received via a communication channel. A first estimate for the channel impulse response of that communication channel is provided and used to process the incoming signal to generate an estimated data symbol. The estimated data symbol is used to generate a soft output feedback decision which is then used to make a further estimate of the channel impulse response.

8 Claims, 4 Drawing Sheets

CHANNEL ESTIMATION IN A CELLULAR COMMUNICATION SYSTEM

This application is a continuation of PCT/EP98/06992 filed Oct. 26, 1998.

BACKGROUND OF THE INVENTION

Technical Field

The present invention relates to a method and circuitry for channel estimation in a cellular communication system.

The invention is particularly concerned with a cellular communication system in which data is transmitted as a plurality of data symbols over a sequence of time slots. As is known, in a CDMA system, data is encoded for transmission by modulating data symbols to be transmitted by a unique spreading code for each of a plurality of communication channels. Within each cell of a cellular communication system, spreading codes allow for a plurality of different mobile stations to communicate with a base station on selectively coded channels.

When a signal is transmitted between a base station and a mobile station (either on the uplink or the downlink), the signal receiving unit needs to establish from the signal which it has received some information about the communication path along which the signal has travelled. This is referred to herein as "channel estimation" and is carried out in a channel estimation unit which generates a channel impulse response. Various techniques are known for channel estimation. The channel impulse response is required in order to properly decode and demodulate incoming data.

In an article in the IEEE Journal a Selected Areas in Communications entitled "A Soft-Output Bidirectional Decision Feedback Equilization Technique for TDMA" (II (1993) September, No 7) a bidirectional adaptive equilization technique that takes advantage of the periodic transmission of training bits in the TDMA frame structure to estimate the location of deep fade within a time slot is proposed.

U.S. Pat. No. 5,732,114 discloses a method of detecting reference signals for a digital data receiver utilising a correlation process between a conjugate of a reference symbol and an incoming signal.

In an earlier proposed CDMA system explained in the Technical Report of IEICE (1996–02) entitled "Variable Rate Data Transmission on Single Code Channels in DS/CDMA" by Okomura et al, data is transmitted at variable transmission rates. Channel estimation is carried out from pilot symbols spaced periodically in the data stream.

One difficulty associated with this proposal is that only the energy from the pilot symbols is available for channel estimation, and the signal to noise ratio of pilot symbols tends to be poor. Thus, filtering is required to get more reliable estimates. In particular, in the case of mobile stations moving at high speeds, it may be difficult to apply a suitable filtering technique due to short channel coherence time.

It is therefore advantageous to use data symbols in addition to the pilot symbols for channel estimation. The present invention seeks to provide a technique for improving channel estimation using estimated data symbols.

BRIEF SUMMARY OF THE INVENTION

According to one aspect of the invention there is provided a method of channel estimation in a cellular communication system in which symbols are transmitted between a mobile station and a base station, the method comprising: receiving via a communication channel an incoming signal that incorporates symbols spread by a spreading code in a CDMA system, the incoming signal including data symbols and pilot symbols, a unique spreading code having been used respectively for pilot symbols and data symbols;

providing a first estimate for the channel impulse response of that communication channel and utilising that first estimate to process the incoming signal to generate an estimated data symbol;

using said estimated data symbol to generate a soft output feedback decision; and using the soft output feedback decision to make a further estimate of the channel impulse response.

According to another aspect of the invention there is provided a method of channel estimation in a cellular communication system in which symbols are transmitted between a mobile station and a base station, the method comprising:

receiving via a communication channel an incoming signal which incorporates symbols spread by a spreading code;

providing a first estimate for the channel impulse response of that communication channel and utilising that first estimate to process the incoming signal to generate an estimated data symbol;

making a further estimate of the channel impulse response by performing a correlation process between a conjugate version of the spreading code and the incoming signal, and multiplying the results of that process by a feedback decision based on said estimated data symbol as a weighting value for the further estimate of the channel impulse response.

The incoming signal can include data symbols and pilot symbols, with a unique spreading code having been used respectively for pilot symbols and data symbols.

According to the further aspect of the invention, the feedback decision may be a soft output or a hard output.

A further aspect of the invention provides circuitry for estimating a channel impulse response in a cellular communication system in which symbols are transmitted between a mobile station and a base station, the circuitry comprising:

a receiver for receiving via a communication channel an in coming signal which incorporates symbols spread by a spreading code;

a channel impulse response generator for providing a first estimate for the channel impulse response of that communication channel;

a data symbol generator for generating an estimated data symbol using the first estimate of the channel impulse response;

circuitry for providing a further estimate of the channel impulse response by performing a correlation process between a conjugate version of the spreading code and the incoming signal, and multiplying the results of that process by a feedback decision based on said estimated data symbol as a weighting value for the further estimate of the channel impulse response.

A still further aspect of the present invention provides circuitry for estimating a channel in a cellular communication system in which symbols are transmitted between a mobile station and a base station, the circuitry comprising:

a receiver for receiving an incoming signal via a communication channel, the incoming signal incorporating symbols spread by a spreading code in a CDMA system, the incoming signal including data symbols and pilot symbols, a unique spreading code having been used respectively for pilot symbols and data symbols;

a channel impulse response generator for providing a first estimate for the channel impulse response of that communication channel;

a data symbols generator for generating an estimated data symbol using that first estimate;

a soft output feedback decision generator for using said estimated data symbol to generate a soft output feedback decision;

wherein the soft output feedback decision is used to make a further estimate of the channel impulse response.

The invention also contemplates a base station and/or a mobile station incorporating circuitry according to the first aspects of the invention.

For a better understanding of the present invention and to show how the same may be carried into effect, reference will now be made by way of example to the accompanying drawings in which:

DETAILED DESCRIPTION OF THE INVENTION

Figure 1:
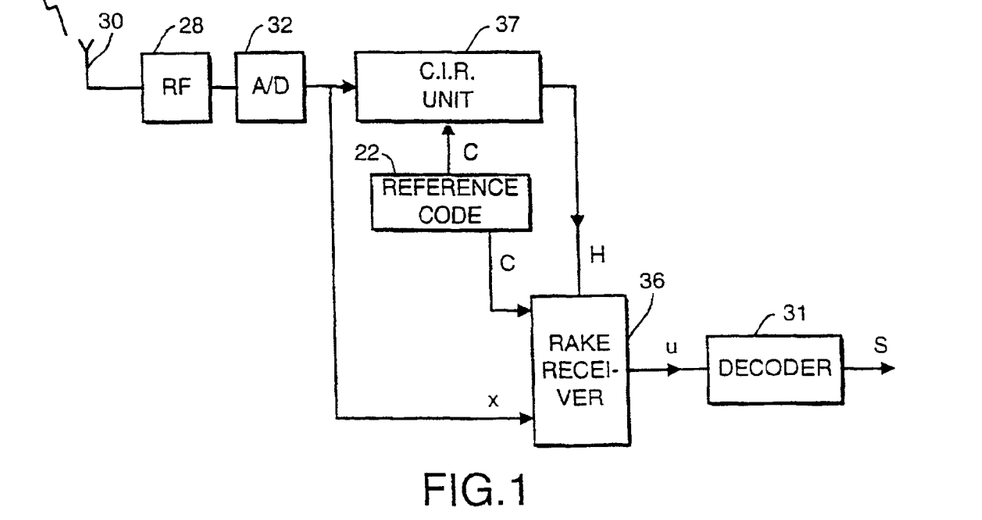
FIG. 1 is a block diagram illustrating schematically symbol estimation in a basic CDMA system.
Figure 2:
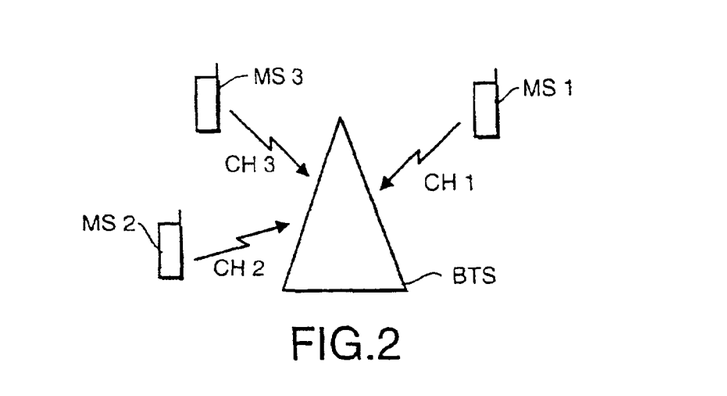
FIG. 2 is a block diagram illustrating a cellular communication system.

FIG. 1 is a block diagram of a basic receiving system in a CDMA cellular communication network. FIG. 2 is a block diagram illustrating a context in which the present invention may be used. That is, a CDMA mobile communication system allows a plurality of mobile stations MS1, MS2, MS3 to communication with a base station BTS in a common cell via RF signals on respective channels CH1, CH2, CH3. These channels are distinguished from one another by the use of spreading codes in a manner which is known per se.

Reverting now to FIG. 1, signals incoming at an antenna 30 are received by an RF unit 28 and supplied to an analogue-to-digital (A/D) converter 32. The A/D converter takes samples of the incoming signals at intervals i to generate digital sampled values x. It will readily be understood that a signal may arrive at the receiving circuitry having experienced multi-paths with differing propagation delays. Each digital sampled value $x_i$ may include therefore components of a number of different symbols depending on the multipath effect.

The digital signal is supplied from the A/D converter 32 to a channel impulse response unit 37 which provides an estimated channel impulse response H for use in processing the incoming signal. A reference code generator 22 supplies a reference code for despreading the incoming signal both to the channel impulse response unit 37 and to a rake receiver 36. The reference code is denoted C and is the unique spreading code for the communication channel on which the signal is received. Thus, it matches the code which was used to spread the signal prior to transmission at the base station or mobile station respectively. Although FIG. 1 illustrates circuitry located at each mobile station, similar circuitry may also be utilised at a base station.

The rake receiver 36 additionally receives the input digital signal x and the estimated channel impulse response H. It generates an estimated transmitted signal u which is supplied to a decoder 31. The decoder estimates symbol values s from the estimated signal u which has been derived from the actual incoming signal x, in a manner which is know per se.

Operation of the rake receiver is known to a person skilled in the art but in any event is described in more detail in Application WO96/24988 in the name of Nokia Mobile Phones Limited.

Figure 3:
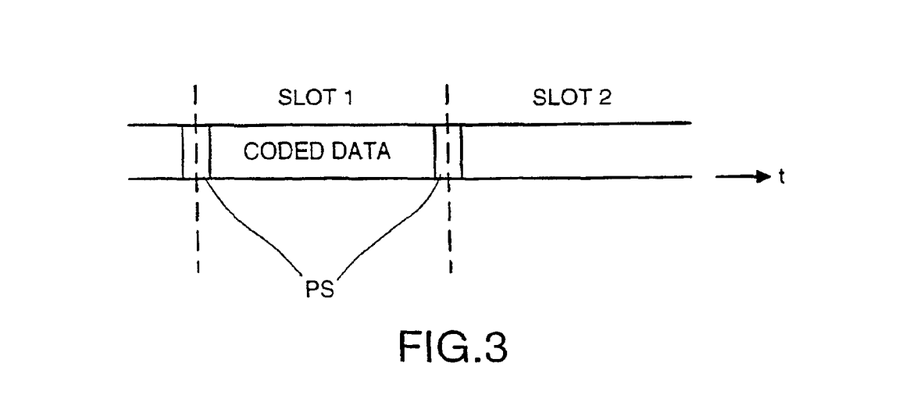
FIG. 3 is a diagram illustrating a transmission time slot structure.

The form in which data is transmitted is illustrated by way of example in FIG. 3. The data symbols are transmitted in a sequence of time slots, each time slot including pilot symbols (PS) and coded data. Data is transmitted as a set of analogue symbols which are produced from originating digital data by i,q modulation. In a CDMA system the symbols are spread by a spreading code prior to transmission. In a typical system, each time slot has a duration of 0.625 ms. The pilot symbols are introduced at the beginning and end of each time slot in a coherent system. These symbols are readily recognisable and so the beginning and end of each time slot can be identified for synchronisation purposes. In the circuit of FIG. 1, the pilot symbols are additionally identified and used in the estimation of the channel impulse response by the channel impulse response 37.

Figure 4:
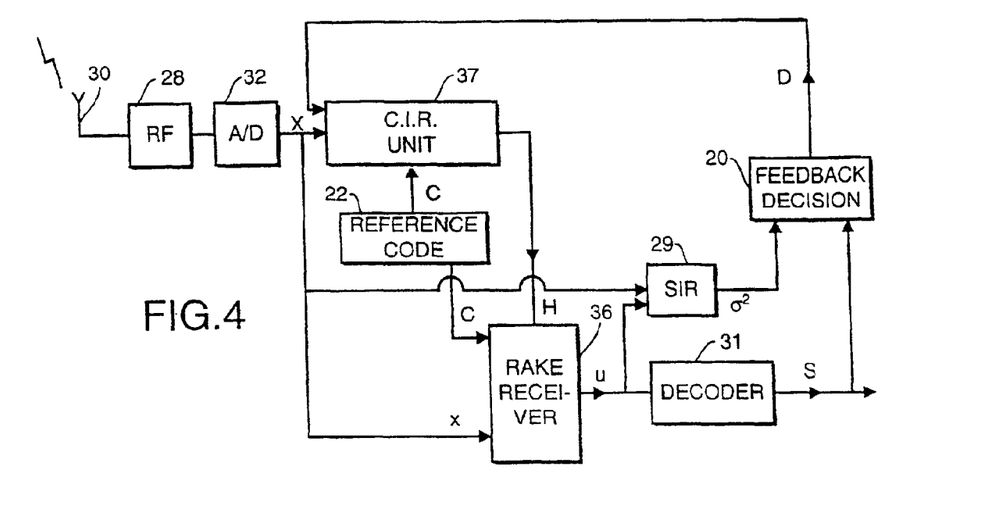
FIG. 4 is a block diagram illustrating channel estimation with feedback.

FIG. 4 illustrates an improved version of the circuitry of FIG. 1. In FIG. 4, the estimated symbol s is fed back to the channel impulse response unit 37 via a feedback decision generator 20 which generates a feedback decision D from the estimated symbol s. That feedback decision D is used to improve the estimate of channel impulse response generated by the CIR unit 37. An SIR block 29 receives the incoming signal samples x and the estimated signal u and calculates the signal to information ratio used to generate noise variance $\sigma^2$ for the feedback decision generator 20.

Figure 5:
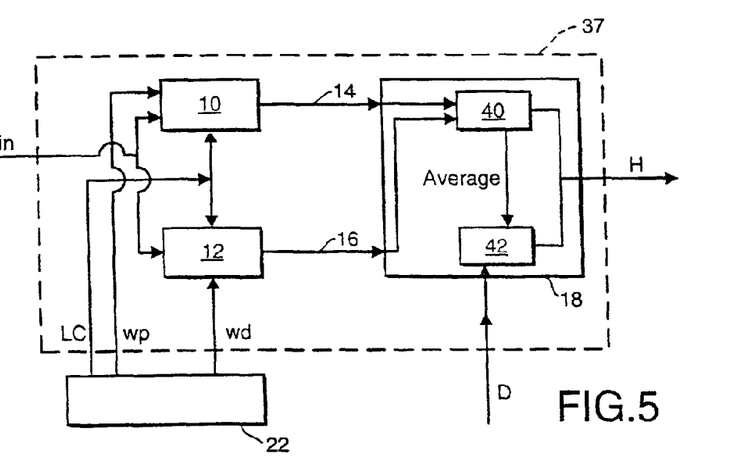
FIG. 5 is a block diagram of circuitry in a channel impulse response unit.

FIG. 5 illustrates how the feedback decision D is used to improve the estimated channel impulse response. FIG. 5 illustrates a CIR unit 37 which is capable of providing an estimated channel impulse response H using both fedback estimated data symbols and incoming pilot symbols. The circuit comprises first and second matched filters 10,12 which are each used to apply the relevant despreading code to the incoming digital signal $x_{in}$. The reference code generator 22 generates three codes. A spreading long code LC is applied to both of the match filters 10,12. A spreading short code $W_p$ for pilot symbols is applied only to the first match filter 10 and a spreading short code $W_d$ for data is applied only to the second match filter 12. The output signals 14,16 from the first and second match filters 10,12 respectively are applied to an averaging circuit 18. The averaging circuit receives the decision feedback D and applies that to the signals 14,16 from the matched filters to generate the estimated impulse response H.

The averaging circuit 18 includes a memory 40 for holding previous channel impulse responses and a weighting/averaging unit 42 for taking an average of the earlier channel impulse responses and applying a weighting function according to the feedback decision value D.

The correlation process which is used to establish the estimate of channel impulse response can be expressed as:

$$H_n(t) = \sum_i D_n \cdot C*(i)x(i+t) = D_n \sum_i C*(i)x(i+t) \quad \text{(Equation 1)}$$

In the above equation, i is the sampling time index along the received signal, t is the resulting sampling time index of the correlation process, x(i+t) is the received data sample for that index, C* is the conjugate of the spreading code and $D_n$ is the $n_{th}$ decision feedback where n is the time index of the impulse response. It will be apparent that the decision feedback D may be in respect of pilot symbols and/or data symbols.

In use, an initial estimate for the channel impulse response H would be established by the CIR unit 37 on the basis only of known incoming pilot symbols in a particular time slot in a manner which is known per se. Alternatively, an initial estimate can be made using Equation (1) without the weighting function D. Once a preliminary estimate of the channel impulse response has been established, this is held in the memory 40 and supplied to the rake receiver 36 for subsequent signal processing of data symbols in that time slot. The first data symbol to be estimated is then subject to feedback to provide a feedback decision D so that a new estimate for the channel impulse response H can be determined using the procedure outlined above and as illustrated in FIG. 5. The spreading code conjugate C* in equation 1 is derived from merging the conjugates of $W_d$ and LC (for data) or $W_p$ and LC (for pilot symbols). Then, an average is taken of the new estimate and the preliminary estimate. Thus, at each estimated symbol an improved channel impulse response is obtained for subsequent processing. The average can be taken coherently within any coherent period, that is part of a slot, one whole slot or a multiple of slots. Alternatively, a non-coherent average can be taken over any period.

It will be apparent from Equation 1 that the correlation process can effectively be implemented without decision feedback as if all the transmitted data symbols are ones. The transmission feedback D acts as an average weighting factor to determine the estimated channel impulse response H.

Figure 6:
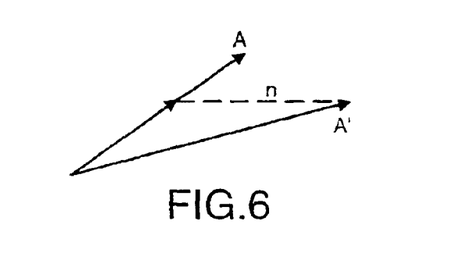
FIG. 6 is a vector space diagram.

Another aspect of the implementation discussed herein is to determine the nature of the decision feedback D generated by the feedback decision generator 20. FIG. 6 illustrates the theory underlying one proposal which is to utilise a soft symbol decision feedback (SDFB) process by generating a soft feedback decision value D. FIG. 6 illustrates a vector diagram of signal space. Vector A is a transmitted data signal. Vector A' is the received data. Vector A is the actual value we expect from the transmitted data signal since the rake receiver cannot be perfect. The received data symbol can be written as:

$$A' = a + n \quad \text{(Equation 2)}$$

where n is the noise vector.

It is natural to assume that both the signal and the noise are zero mean. We have:

$$E\{a\} = 0$$

$$E\{n\} = 0$$

$$E\{A'\} = E\{a+n\} = 0 \quad \text{(Equation 3)}$$

In a binary (+1/−1) environment, we have also:

$$E\{AA^*\} = 1 \quad \text{(Equation 4)}$$

$$E\{A'A'^*\} = E\{(a+n)(a+n)^*\}$$
$$= E\{a\ a^*\} + E\{nn^*\}$$
$$= E\{a\ a^*\} + \sigma^2$$

where $\sigma^2$ is the noise variance.

With these statistics of the signal, the soft output can be adjusted to satisfy the conditions for feedback if the noise variance is known beforehand. For a simple solution, we suppose that the signal loss is minimum and can be neglected:

$$|a-A| \to 0$$

Then equation (3) becomes:

$$E\{A'A'^*\} = E\{a\ a^*\} + \sigma^2 \quad \text{(Equation 5)}$$
$$= E\{A\ A^*\} + \sigma^2$$
$$= 1 + \sigma^2$$

Using this analysis, the feedback decision generator can generate a soft value D satisfying the following requirements:

$$E\{D\} = 0 \quad \text{(Equation 6)}$$

$$E\{DD^*\} = 1 + \sigma^2 \quad \text{(Equation 7)}$$

As an alternative, a hard decision feedback may be utilised by performing a binary cut-off, that is to provide either +1 or −1 to the input of the channel impulse response unit for each estimated symbol S.

Figure 7:
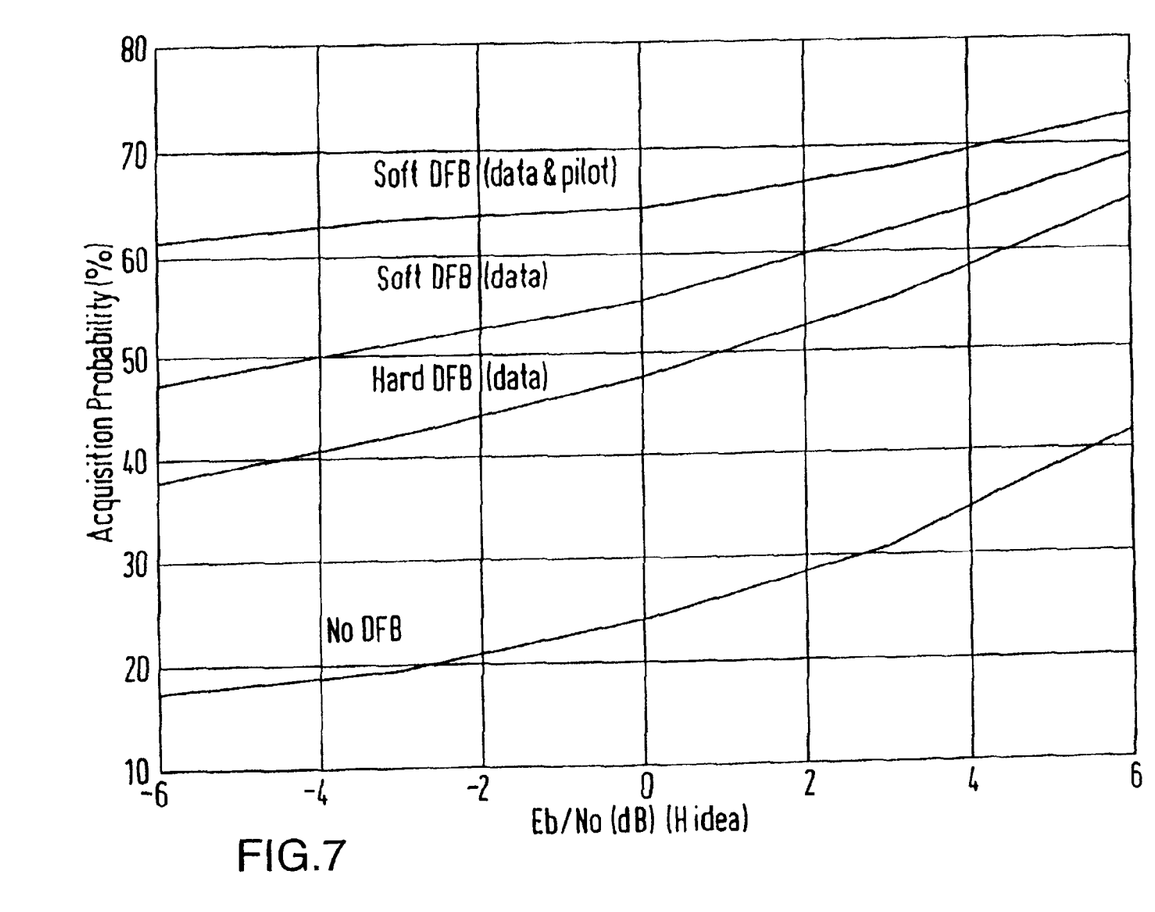
FIGS. 7 and 8 are simulations of acquisition probability against signal energy per bit to noise ratio.
Figure 8:
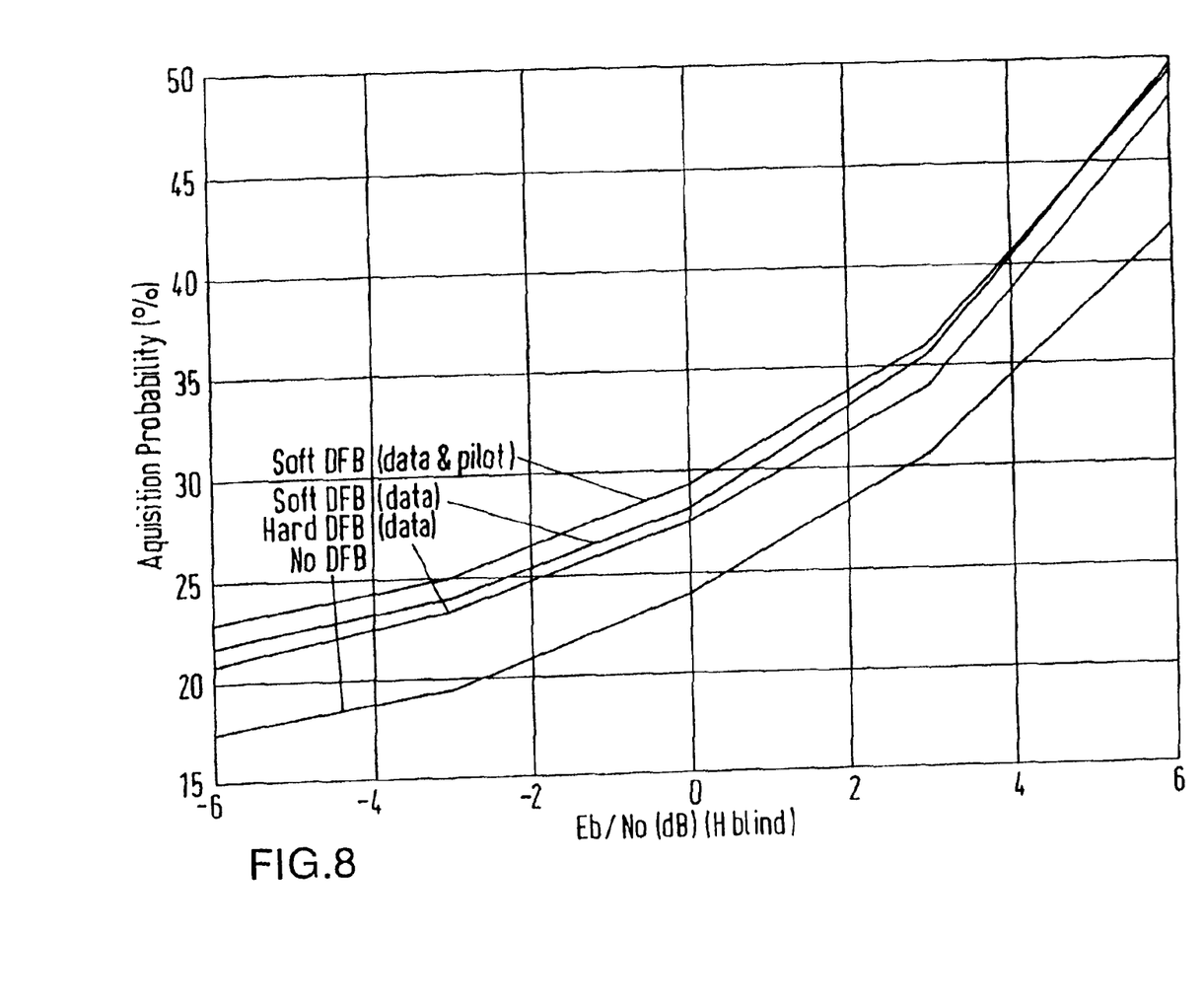

The effectiveness of both solutions is illustrated in FIGS. 7 and 8. In FIGS. 7 and 8, the x axis represents signal energy per bit to noise ratio ($E_b/N_o$) and the y axis represents the scale of acquisition probability—that is the likelihood that all signal propagation paths have been captured in the received signal as estimated using the C.I.R. FIG. 7 is the simulation results with the best possible channel estimation, and FIG. 8 is the simulation results in which the channel information of a slot is obtained only from the pilot symbols in the same slot. These simulations have been generated based on the MATLAB program included as Annexe 1. The simulation results compare the acquisition probabilities of the impulse response of different approaches of the decision feedback compared with no decision feedback. In both cases, it can be seen that the best results are given by a soft decision feedback for both pilot and data symbols. This is the top line in both simulations. The next line is for soft feedback decisions relating only to data symbols, that is without pilot symbol feedback being taken into account.

The next line is for hard data feedback decisions in respect of data symbols only.

The lowest line is where there is no decision feedback.

ANNEXE 1

```
MATLAB program
% Soft Decision Feedback
% ARIB specification
% QZD/NTC - FEB.98 - Oulu
clear, rand ('seed',0),   randn ('seed',0)
Dat_Weight = 0.5; SNR = -30:3:0; Fingers = 10;
h=[0.7+j*0.1,0,0,0,-0.5-j*0.3,0,0,0,0,0.3+j*0.5,0,0, ...
    0.1-j*0.13,0,0,0,0,0,0,0,0.3-j*0.1,0,0,0,0.5+j*0.5, ...
    0,0,0,-0.5-j*0.3,0,0,0,0,0.3+j*0.5,0,0,0.1-j*0.13, ...
    0,0,0,0,0,0,0.3-j*0.1];
h=h/sqrt (h*h');
AcqError = zeros (size (SNR,2), 4);
for kkk = 1:size (SNR,2)
snr = SNR (kkk)           % SNR in dB
        for nnn=1:1000
DAT = (rand (1,40)>0.5)*2-1;
% CODE
CL_I=(rand (1,2560)>0.5)*2-1;   CL_Q=(rand (1,2560)>0.5)*2-1;
C = CL_I + j*CL_Q;
w=1;for k=1:6;w=[w w;w -w];end;w0=w (1,:);w1=w (2, :);clear w;
W0=[];W1=[]; for k=1:40, W0=[W0,w0];W1=[W1,w1];end
C0 = w0 .*C; C1 = W1 .*C;
% Spreading
D=[]; for k=1:40,   D=[D,DAT (k) *w1];end % Data
P=ones (size (D));                          % PILOT
x1 = (D + j*P) .* C;
% Channel
x2 = conv (x1,h)/2;
% Noise
nA=1/10^ (snr/20) ;for                                    k=1:size (x2,2);
n (k)=nA*randn*exp (j*rand*2*pi) ;end
x = x2 + n;
%%%%%%%%%%%%%%%%% MF %%%%%%%%%%%%%%%%%%%
IRPilot = zeros (39, 64); IRData = zeros (39, 64);
for k=1:39, 1=(k-1) *64;
    for m = 1:64
        IRPilot (k,m) = IRPilot (k,m) + x (1+m-1+(1:64))*C0 (1+(1:64))';
        IRData (k,m) = IRData (k,m) + x (1+m-1+(1:64))*C1 (1+(1:64))';
    end
end
IRPilot = -j*IRPilot /64;
IRPilotHard=sum (IRPilot (1:28,:))/28;
IRData = IRData/64;
%%%%%%%%%%%%%%%%%%%% H' %%%%%%%%%%%%%%%%%%%%%%%%%
a = IRPilotHard .* conj (IRPilotHard);
H = zeros (size (h));
for k = 1:Fingers, findf = 0;
    while ( findf < 1)
        [n,m]=max (a); a (m)=0;
        if (m<=size (h,2)), H (m)=IRPilotHard (m); findf=2; end
    end
end
%%%%%%%%%%%%%%%%% decision %%%%%%%%%%%%%%%%%%%
h1=find (abs (h) >0.01);
h2=h1;                     % Idea
%h2=find (abs (H) >0.01);   % blind
PilotSoft = zeros (1,28); DataSoft = zeros (1,40);
for n=1:Fingers
a = x (h2 (n) :size (C0,2)+h2 (n) -1) .* conj (C0) * conj (H (h2 (n)));
    for k=1:28
        PilotSoft (k) = PilotSoft (k) + imag (sum (a ( (k-1) *64+1:k*64)));
    end
a = x (h2 (n) :size (C1,2)+h2 (n) -1) .* conj (C1) * conj (H (h2 (n)));
    for k=1:40
        DataSoft (k) = DataSoft (k) + real (sum (a ( (k-1) *64+1:k*64)));
    end
end
PilotSoft = PilotSoft/64;
DataSoft = DataSoft/64;
DataHard = sign (Datasoft);
%%%%%%%%%%%%%%%%% Averaging %%%%%%%%%%%%%%%%%%
a = 0; b = 0; c = 0;
IRHard=zeros (1,64); IRSoft=zeros (1,64); IRSoftp=zeros (1,64);
IRSofter=zeros (1,64); IRSofterp=zeros (1,64);
for k=1:39
        IRHard=IRHard+IRData (k,:) *DataHard (k); a=a+abs (DataHard (k));
        IRSoft=IRSoft+IRData (k,:) *DataSoft (k); b=b+abs (DataSoft (k));
end
```

ANNEXE 1-continued

```
for k=1:28
        IRSoftp=IRSoftp+IRPilot (k,:) *PilotSoft (k); c=c+abs
        (PilotSoft (k));
end
IRSoftp = IRSoft*Dat_Weight/b + IRSoftp    * (1−Dat_Weight)/c;
IRHard  = IRHard*Dat_Weight/a + IRPilotHard* (1−Dat_Weight);
IRSoft  = IRSoft*Dat_Weight/b + IRPilotHard* (1−Dat_Weight);
%*********** acq probability ************
a = IRPilotHard .* conj (IRPilotHard);
for k=1:size (h1,2), [n,m]=max (a) ;h2 (k)=m;a (m)=0;end
c=0; for k=1:size (h1,2),for n=1:size (h1,2)
           if (h2 (k)==h1 (n)), c=c+1; h2 (k)=0; end
        end, end
AErrNoDFB = size (h1,2)−c;
a = IRHard .* conj (IRHard);
for k=1:size (h1,2), [n,m]=max (a);h2 (k)=m;a (m)=0;end
c=0; for k=1:size (h1,2),for n=1:size (h1,2)
           if (h2 (k)==h1 (n)), c=c+1; h2 (k)=0; end
        end, end
AErrHardDFB = size (h1,2)−c;
a = IRSoft .* conj (IRSoft);
for k=1:size (h1,2),[n,m]=max (a);h2 (k)=m;a (m)=0;end
c=0; for k=1:size (h1,2),for n=1:size (h1,2)
           if (h1 (k)==h1 (n)), c=c+1; h2 (k)=0; end
        end, end
AErrSoftDFB = size (h1,2)−c;
a = IRSoftp .* conj (IRSoftp);
for k=1:size (h1,2), [n,m]=max (a);h2 (k)=m;a (m)=0;end
c=0; for k=1:size (h1,2), for n=1:size (h1,2)
           if (h2 (k)==h1 (n)), c=c+1; h2 (k)=0; end
        end, end
AErrSoftPDFB = size (h1,2)−c;
AcqError (kkk,:)=AcqError (kkk, :)+. . .
  [AErrNoDFB, AErrHardDFB, AErrSoftDFB, AErrSoftPDFB]
        end     % nnn
end             % kkk
```

What is claimed is:

1. A method of channel impulse response estimation in a cellular communication system in which symbols are transmitted between a mobile station and a base station, the method comprising:

receiving via a communication channel an incoming signal that incorporates symbols spread by a spreading code in a CDMA system, the incoming signal including data symbols and pilot symbols, a unique spreading code having been used respectively for pilot symbols and data symbols;

providing a first estimate for the channel impulse response of that communication channel and utilising that first estimate to process the incoming signal to generate an estimated data symbol;

using said estimated data symbol to generate a soft output feedback decision; and using the soft output feedback decision to make a further estimate of the channel impulse response.

2. A method according to claim 1, wherein the channel impulse response is estimated by performing a correlation process between a conjugate version of the spreading code and the incoming signal, and multiplying the results of that process by the soft output feedback decision value as a weighting value for the channel impulse response.

3. A method according to claim 1, in which a long spreading code has additionally been used to spread the data and pilot symbols prior to transmission.

4. A method of channel impulse response estimation in a cellular communication system in which symbols are transmitted between a mobile station and a base station, the method comprising:

receiving via a communication channel an incoming signal which incorporates symbols spread by a spreading code;

providing a first estimate for the channel impulse response of that communication channel and utilising that first estimate to process the incoming signal to generate an estimated data symbol;

making a further estimate of the channel impulse response by performing a correlation process between a conjugate version of the spreading code and the incoming signal, and multiplying the results of that process by a feedback decision based on said estimated data symbol as a weighting value for the channel impulse response.

5. A method according to claim 4, wherein the feedback decision is a soft output.

6. A method according to claim 4, wherein the feedback decision is a hard output.

7. Circuitry for estimating a channel impulse response in a cellular communication system in which symbols are transmitted between a mobile station and a base station, the circuitry comprising:

a receiver for receiving via a communication channel an incoming signal which incorporates symbols spread by a spreading code;

a channel impulse response generator for providing a first estimate for the channel impulse response of that communication channel;

a data symbol generator for generating an estimated data symbol using the first estimate of the channel impulse response;

circuitry for providing a further estimate of the channel impulse response by performing a correlation process between a conjugate version of the spreading code and the incoming signal, and multiplying the results of that process by a feedback decision based on said estimated data symbol as a weighting value for the further estimate of the channel impulse response.

8. Circuitry for estimating a channel in a cellular communication system in which symbols are transmitted between a mobile station and a base station, the circuitry comprising:

- a receiver for receiving an incoming signal via a communication channel, the incoming signal incorporating symbols spread by a spreading code in a CDMA system, the incoming signal including data symbols and pilot symbols, a unique spreading code having been used respectively for pilot symbols and data symbols;
- a channel impulse response generator for providing a first estimate for the channel impulse response of that communication channel;
- a data symbols generator for generating an estimated data symbol using that first estimate;
- a soft output feedback decision generator for using said estimated data symbol to generate a soft output feedback decision;

wherein the soft output feedback decision is used to make a further estimate of the channel impulse response.

* * * * *